UNITED STATES PATENT OFFICE 2,436,195

PRODUCTION OF 7-DEHYDRO-CHOLESTEROL

James Allan Callan, North Brunswick, N. J., assignor to E. I. du Pont de Nemours & Company, Wilmington, Del., a corporation of Delaware No Drawing. Application January 24, 1945,
Serial No. 574,446

8 Claims. (Cl. 260—397.2)

This invention relates to the production of compounds of the group consisting of 7-dehydro-cholesterol and its esters.

It is well known that certain 7-dehydro sterols as for instance 7-dehydro-cholesterol, ergosterol, etc. are valuable provitamins which may be antirachitically activated to produce vitamin D.

7-dehydro-cholesterol may be obtained by chemical synthesis involving the thermal decomposition of 7-hydroxy-cholesterol or its carboxylic acid esters. U. S. Patents Nos. 2,098,984, 2,209,934 and others describe the production of 7-dehydro sterol compounds by the chemical removal of the elements of water or organic acid from 7-hydroxy-cholesterol or its esters. As a result of this reaction a double bond is formed between the seventh and eighth carbons in ring II of the sterol ring system which is conjugated with the existing double bond between carbons 5 and 6.

A serious disadvantage of this reaction is the formation of large quantities of various resinous and crystalline by-products, which upon subsequent irradiation do not form products having antirachitic activity. In the case of the provitamin derived from 7-hydroxy-cholesterol, the crystalline by-product is generally referred to as isodehydro-cholesterol, and has been identified in the literature as Δ6:8-cholestadienol-3. (Windaus, Ann. 534, 22–41; Ch. Abst. 32, 4603.)

The following formulas further bring out the distinction:

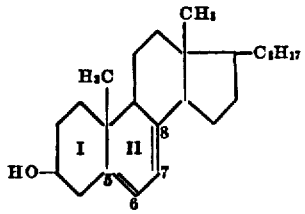

7-dehydro-cholesterol (5:7-isomer)

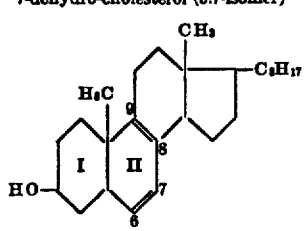

Isodehydro-cholesterol (6:8-isomer)

Hitherto no method has apparently been known for transforming isodehydro-cholesterol into a useful product, and this by-product therefore constituted waste material.

This invention accordingly has as an object the production of useful provitamin material from the aforementioned isodehydro-cholesterol. A further object is the conversion of said by-product into the corresponding 7-dehydro-cholesterol. Other and further important objects of this invention will appear as the description proceeds.

Now according to my invention, the above objects are achieved in an economic and practical manner by subjecting the said crystalline by-product to heat treatment, which results in its conversion into the useful 5:7 isomer. I have found that the simple expedient of heat treatment will cause isomerization of isodehydro-cholesterol into the normal provitamin D.

The heat treatment, is for practical purposes achieved best by heating the isodehydro compound at temperatures between 150 and 300° C. The heating may be effected in a high boiling organic diluent or solvent, for instance a high boiling hydrocarbon, alcohol or amine; or it may be effected in a low boiling organic solvent, for instance benzene, if a closed vessel is employed. Optionally, isomerization may also be achieved by heating the isodehydro compound by itself until it fuses, and maintaining a temperature between 150 and 300° C. until a test sample shows that isomerization has proceeded to a satisfactory degree.

The by-product material being thus heat-treated may be in the free hydroxy state, that is the 3-OH compound, or it may be in the form of a carboxylic ester thereof, for instance the benzoate, acetate or propionate. Such esters are often obtained directly in the process of separating the waste by-product from the principal reaction product in the conversion of 7-hydroxy-cholesterol diester into the corresponding 7-dehydro compound. Of course, common sense dictates that the ester selected for this purpose shall not be of an explosive or otherwise hazardous nature. It will be understood therefore that where I speak at random of esters of isodehydro-cholesterol hereinafter in this disclosure, I am referring to non-hazardous esters, as would naturally be selected for the process by a person skilled in the art.

When the isodehydro material selected for treating is in the form of an ester, there is a possibility that under certain conditions part of the ester will decompose, liberating free organic acid; and since acid has a tendency to deactivate dehydrosteroid compounds, it is recommended to add a mild alkali, such as sodium bicarbonate or an organic amine, in small quantities to the isomerization mass. Alternatively, the organic solvent may be selected so as to create or maintain in the reaction mass a mild alkalinity, that is a pH of at least 7. From this viewpoint, liquid organic bases which are inert toward the material being treated, are ideal as solvent media, and may be illustrated by dimethyl-aniline, quinoline, pyridine or picoline, the reaction in the latter two cases being carried out in a closed vessel.

My invention, however, is by no means limited to the mentioned solvent media, since excellent results are, according to my experience, obtained also with non-basic, inert solvents, such as terpineol, tetralin, benzyl alcohol, benzylbenzoate, isophorone, petroleum hydrocarbons boiling in the neighborhood of 200° C., and in general any inert, organic liquid boiling within the range of 150 to 300° C., and such heating may be carried out in the presence or absence of acid absorbing agents. As already said, the latter are not essential if the slight amount of acid decomposition is not objectionable.

Where the thermal isomerization according to this invention has been performed on an ester of the isodehydro compound, the isomerized product may then be subjected to saponification in the customary manner, to liberate the free 3-OH compound.

Without limiting my invention, the following examples are given to illustrate my preferred mode of operation. Parts mentioned are by weight.

*Example 1.—Isomerization of benzoate; terpineol, as solvent*

6.4 parts of isodehydro-chloesteryl benzoate (Windaus, Linsert and Eckhardt, Annalen 534, 22-41; melting range 138-140° C., with green fluorescence, clearing at 180° C.) were charged into a glass vessel equipped with thermometer, reflux condenser and agitator. 64 parts of terpineol (B. P. 216-220° C.) were added and solution was effected by heating with agitation at 70-90° C. for 1 hour. 1.3 parts of sodium bicarbonate were then added, and the mixture was heated to reflux temperature and held at reflux for 2 hours. The charge was then cooled to 90° C., and 10 parts of water were added to dissolve soluble salts. The aqueous layer was removed and the washing operation was repeated with 10 parts of water. The mass was then distilled under vacuum to remove the bulk of the terpineol (55-58 parts), and 24 parts of acetone were added to the warm residue.

A crop of granular crystals precipitated, and these were filtered off with suction and washed with 1 to 2 parts of acetone. 5 parts of 7-dehydro-cholesteryl-benzoate were obtained, melting at 137-141° C. without green fluorescence, and clearing at 181° C.

To convert the above into the free 3-OH compound, the 7-dehydro-cholesteryl benzoate was saponified by dissolving in 10 parts of benzene, adding a solution of 1.3 parts potassium hydroxide in 20 parts of methanol, and refluxing the mixture for 1 hour. 2.5 parts of water were then added, and heating was continued until 7 to 8 parts of mixed solvent were distilled off. The residual mass was cooled to 10° C., filtered under suction, and the crystalline residue was washed with methyl alcohol. The product had a melting range of 130-135° C., and an angle of rotation $\alpha_{20}^D = -84°$, which properties agree well with those of crude 7-dehydro-cholesterol, as obtained in a typical deacylation of 7-hydroxycholesteryl dibenzoate.

For analytical comparison, a sample of the isodehydrocholesteryl benzoate was subjected to saponification in the above manner without previous isomerization. The resulting isodehydrocholesterol (free OH form) had a melting range of 117-120° C. and $\alpha_{20}^D = -31°$.

*Example 2.—Isomerization of the free OH compound; dimethyl aniline, as solvent*

The free 3-OH form of isodehydro-cholesterol is first prepared by charging 10 parts of the 3,5-dinitrobenzoic ester of isodehydro-cholesterol (M. P. 194° C.) into 20 parts of benzene, adding 2 parts of potassium hydroxide dissolved in 32 parts of methanol, and refluxing for 1 hour. The charge is then cooled, diluted with 100 parts of water, and the benzene layer is separated and washed with water until free of soluble salts.

The benzene solution of isodehydro-cholesterol thus obtained is charged into a flask containing 30 parts of dimethyl aniline, and the benzene is distilled off by heating to a gentle reflux (190° C.) over 2 to 3 hours. The charge is cooled slowly and then subjected to vacuum distillation to remove 25-26 parts of the dimethyl aniline. From the resulting concentrated residue, 7-dehydro-cholesterol may be recovered by crystallization from a mixture of benzene and methanol.

For analytical purposes, or for the purpose of separating the 5:7 isomer from any residual 6:8 isomer, the crude reaction mass hereinabove obtained may be converted into its 3,5-dinitrobenzoic ester by the following procedure: The concentrated residue hereinabove mentioned, after distilling off the bulk of dimethyl aniline, is diluted with 6 parts of pyridine, and then 7 parts of 3,5-dinitrobenzoyl chloride, dissolved in 16 parts of dry benzene, are added. The mixture is allowed to stand for 2 hours and the ester of the isomerized sterol, which crystallizes out, is filtered off, and recrystallized from a mixture of equal parts of benzene and acetone. The yellow, crystalline product has a melting range of 209-210° C., which corresponds to that of 7-dehydro-cholesteryl-3,5-dinitrobenzoate.

From the mother liquors, some residual 6:8 isomer may be isolated as the 3:5-dinitro-benzoate by concentrating the liquors and filtering. The recovered ester may then be saponified to isodehydro-cholesterol as above described, and may then be resubjected to isomerization, together with an additional fresh portion of the by-product, if desired. In this fashion, by recycling repeatedly the recovered isodehydrocholesterol, the percentage conversion thereof into provitamin over a series of cycles can be made very high.

*Example 3.—Isomerization without alkali*

The procedure is essentially the same as in Example 1. For instance, 6 parts of isodehydrocholesteryl benzoate are charged into a glass flask equipped with an agitator, reflux condenser and thermometer. Sixty parts of terpineol (boiling range 216-220° C.) are added and the mass is heated slowly to a gentle reflux and held at reflux for 3 hours. Then, upon cooling to 90° C., vacuum is applied and about 54 parts of the terpineol are distilled off. Into the remaining warm residue, 24 parts of acetone are added and the granular crystals which form are filtered off and washed with 1 to 2 parts of acetone. 7-dehydro-cholesteryl benzoate is obtained which melts without fluorescence. This product may be saponified as in Example 1, followed optionally by reesterification with 3,5-dinitrobenzoyl chloride, as in Example 2 above, for the purpose of analytical study.

*Example 4.—Isomerization in the absence of a solvent*

Charge 5 parts of isodehydro-cholesteryl benzoate into a glass vessel equipped with an agitator and a thermometer. Heat this material to a temperature of 210° C., during which time the melted crystals exhibit a green fluorescence. Hold the reaction temperature at 210° C. for 2 hours or until a sample of the reaction mass does not fluoresce on cooling to 130° C. This test indicates that the isomerization reaction is finished. Then cool to 80° C. and add 6 parts of benzene, and 10 parts of acetone. Granular crystals precipitate which are filtered at 25° C., washed with 3 parts of acetone and dried. From this crude product, 7-dehydro-cholesterol in pure form may readily be isolated by means of customary purification steps.

*Example 5.—Isomerization of the benzoate; using glycerin as a diluent*

Charge 5 parts of isodehydro-cholesteryl benzoate, melting with bluish green fluorescence, into a glass flask equipped with an agitator, distilling condenser and thermometer. Add 25 parts of C. P. glycerin and heat the reaction mass to 210° C. During the course of this heating, a brilliant green and violet color display is observed. Hold the reaction mass at a temperature of 210° C. for 3 hours during which time the green violet color gradually disappears, indicating that the isomerization has been completed. If not agitated, glycerin separates from the molten sterol ester. Cool to 80° C., add 50 parts of water and extract the isomerized sterol benzoate with 10 parts of benzene. Wash the separated benzene layer with 10 parts of warm water, separate and add 10 parts of acetone to the benzene layer. A crop of granular crystals precipitates, which after filtration, washing with 2 parts of acetone and drying yields 7-dehydro-cholesteryl benzoate, which melts without fluorescence. This product may be further purified to give pure 7-dehydro-cholesterol in good yield.

In all of the above examples, the isomerization of isodehydro-cholesteryl benzoate to 7-dehydro-cholesteryl benzoate is particularly characterized by the disappearance of the bluish green fluorescence which is observed when isodehydro-cholesteryl benzoate is heated to its melting point. A comparison of the rotation in chloroform between samples of isodehydro-cholesterol and 7-dehydro-cholesterol, obtained by the saponification of isomerized isodehydro-cholesteryl benzoate, shows that the alevo-rotatory angle has increased from −31° to −84°. The latter figure is in agreement with the rotation for 7-dehydro-cholesterol obtained from 7-hydroxy-cholesteryl dibenzoate by debenzoylation followed by saponification. The melting ranges of the free sterols before and after this isomerization also undergo a characteristic change. The melting range increases from 117–120° C. to 130–135° C. which is closer to the melting range of crude 7-dehydro-cholesterol, as above obtained. Additional proof of the chemical nature of the isomerized product is furnished by spectrographic analysis which shows that it possesses the characteristic absorption lines of 7-dehydro-cholesterol.

In lieu of the 3-benzoate, other carboxylic acid esters of the isodehydro compound may be employed, which are not hazardous at the temperature of isomerization. The ester is not limited to aromatic carboxylic acids; the acetate and propionate are common examples of the aliphatic ester type. In addition, as already shown, the sterol may be isomerized also in free OH form.

The conditions of the reaction may be varied widely without departing from the scope of this invention. That is, the temperature used may range from 150 to 300° C., but an increase in the time required for the completion of the isomerization is needed when operating at a low temperature. The solvents used in this reaction may be any organic material which does not have an acid reaction (i. e. pH below 7) at the temperature employed. Additional illustrations of these may be found in the numerous hydrocarbons, oxygenated compounds, and nitrogenous bases listed in U. S. Patents Nos. 2,255,815 and 2,341,733. Preferred solvents are those which are liquid at 200° C. A diluent which is not a solvent for isodehydro sterols may also be used. If a liquid boiling below 150° C. is used, benzene for example, the preferred reaction temperature of 200° C. may be attained by employing an appropriate pressure apparatus.

The addition of a mild alkaline reacting salt is a preferred embodiment of this invention but the isomerization of isodehydro-cholesterol will take place also by heating without the addition of such alkaline reacting substance. Some of the other alkaline reacting salts which may be used are alkaline earth carbonates, bicarbonates, acetates, basic phosphates, etc.

Various amines have a beneficial effect in this isomerization and this applies both to isomerization in ester form and in free OH form. Some liquid bases, such as quinoline, pyridine, alpha picoline and others, are also useful in serving as an acid binding agent in the subsequent procedure, if the crude isomerized sterol is to be purified by conversion into an ester thereof by the aid of an acyl chloride.

The uses and advantages of this invention will now be readily apparent. My invention makes it possible to reclaim an otherwise waste product in the production of vitamin D into a useful product. Moreover, the useful product thus obtained is identical with the principal product aimed at in the manufacture of provitamin from cholesterol, and thus adds to the overall yield of the principal product. My process is also characterized by extreme simplicity of procedure, requiring no complicated apparatus and no consumption of expensive chemicals and reagents, and being effected in essence by the simple expedient of heating.

The results of this invention are particularly surprising inasmuch as the isodehydro-cholesterol used as starting material is itself formed in a thermal deacylation procedure which is often conducted in a reaction medium and at a temperature similar to those used in this invention.

In the claims below where I speak of heating isodehydro-cholesterol or an ester thereof "in bulk," I mean by the phrase to designate treatment of the above by-product material by itself, as distinguished from heating in a solvent or diluent, and as further distinguished from heating a reaction mass containing this sub-

I claim as my invention:

1. The process of converting an isolated mass consisting essentially of a compound selected from the group consisting of isodehydro-cholesterol and its esters into provitamin material, which comprises heating said mass at a temperature between 150° and 300° C. to produce the corresponding 7-dehydro-cholesterol compound.

2. The process of converting an isolated mass consisting predominantly of a compound selected from the group consisting of isodehydro-cholesterol and its esters into the corresponding 7-dehydro-cholesterol compound, which comprises heating said mass to a temperature between 150° and 300° C. under mildly alkaline conditions.

3. The process of converting an isolated mass composed essentially of a compound selected from the group consisting of isodehydro-cholesterol and its esters into the corresponding 7-dehydro-cholesterol compound, which comprises heating said mass to a temperature between 150° and 300° C. in an organic solvent in the presence of an acid absorbing agent.

4. The process of converting an isolated mass compound essentially of a compound selected from the group consisting of isodehydro-cholesterol and its esters into the corresponding 7-dehydro-cholesterol compound, which comprises heating said mass to a temperature between 150° and 300° C. in the presence of a liquid nitrogenous base.

5. The process of producing 7-dehydro-cholesterol, which comprises heating isodehydro-cholesterol in bulk at a temperature between 150° and 300° C.

6. The process of producing 7-dehydro-cholesterol, which comprises heating an ester of isodehydro-cholesterol in bulk at a temperature between 150° and 300° C., and then saponifying the reaction product.

7. The process of producing 7-dehydro-cholesterol benzoate, which comprises heating a mass composed essentially of the benzoate of isodehydro-cholesterol in terpineol in the presence of an alkaline bicarbonate at the reflux temperature of the reaction mass.

8. The process of producing 7-dehydro-cholesterol, which comprises heating a mass composed essentially of isodehydro-cholesterol in dimethylaniline at the reflux temperature of the reaction mass.

JAMES ALLAN CALLAN.

REFERENCES CITED

The following references are of record in the file of this patent:

UNITED STATES PATENTS

| Number | Name | Date |
|---|---|---|
| 2,098,984 | Windaus | Nov. 16, 1937 |
| 2,209,934 | Rosenberg | July 30, 1940 |
| 2,255,815 | Rosenberg | Sept. 16, 1941 |
| 2,341,733 | Meuly | Feb. 15, 1944 |

OTHER REFERENCES

Windaus, Annalen, vol. 534, pages 22–41 (1938).

Certificate of Correction

Patent No. 2,436,195.  February 17, 1948.

JAMES ALLAN CALLAN

It is hereby certified that errors appear in the printed specification of the above numbered patent requiring correction as follows: Column 5, line 64, for the word "alevo-rotatory" read *laevo-rotatory*; column 7, line 28, for the word "compound", first occurrence, read *composed*; and that the said Letters Patent should be read with these corrections therein that the same may conform to the record of the case in the Patent Office.

Signed and sealed this 27th day of April, A. D. 1948.

[SEAL]

THOMAS F. MURPHY,
*Assistant Commissioner of Patents.*

I claim as my invention:

1. The process of converting an isolated mass consisting essentially of a compound selected from the group consisting of isodehydro-cholesterol and its esters into provitamin material, which comprises heating said mass at a temperature between 150° and 300° C. to produce the corresponding 7-dehydro-cholesterol compound.

2. The process of converting an isolated mass consisting predominantly of a compound selected from the group consisting of isodehydro-cholesterol and its esters into the corresponding 7-dehydro-cholesterol compound, which comprises heating said mass to a temperature between 150° and 300° C. under mildly alkaline conditions.

3. The process of converting an isolated mass composed essentially of a compound selected from the group consisting of isodehydro-cholesterol and its esters into the corresponding 7-dehydro-cholesterol compound, which comprises heating said mass to a temperature between 150° and 300° C. in an organic solvent in the presence of an acid absorbing agent.

4. The process of converting an isolated mass compound essentially of a compound selected from the group consisting of isodehydro-cholesterol and its esters into the corresponding 7-dehydro-cholesterol compound, which comprises heating said mass to a temperature between 150° and 300° C. in the presence of a liquid nitrogenous base.

5. The process of producing 7-dehydro-cholesterol, which comprises heating isodehydro-cholesterol in bulk at a temperature between 150° and 300° C.

6. The process of producing 7-dehydro-cholesterol, which comprises heating an ester of isodehydro-cholesterol in bulk at a temperature between 150° and 300° C., and then saponifying the reaction product.

7. The process of producing 7-dehydro-cholesterol benzoate, which comprises heating a mass composed essentially of the benzoate of isodehydro-cholesterol in terpineol in the presence of an alkaline bicarbonate at the reflux temperature of the reaction mass.

8. The process of producing 7-dehydro-cholesterol, which comprises heating a mass composed essentially of isodehydro-cholesterol in dimethyl-aniline at the reflux temperature of the reaction mass.

JAMES ALLAN CALLAN.

REFERENCES CITED

The following references are of record in the file of this patent:

UNITED STATES PATENTS

| Number | Name | Date |
|---|---|---|
| 2,098,984 | Windaus | Nov. 16, 1937 |
| 2,209,934 | Rosenberg | July 30, 1940 |
| 2,255,815 | Rosenberg | Sept. 16, 1941 |
| 2,341,733 | Meuly | Feb. 15, 1944 |

OTHER REFERENCES

Windaus, Annalen, vol. 534, pages 22–41 (1938).

Certificate of Correction

Patent No. 2,436,195.  February 17, 1948.

JAMES ALLAN CALLAN

It is hereby certified that errors appear in the printed specification of the above numbered patent requiring correction as follows: Column 5, line 64, for the word "alevo-rotatory" read *laevo-rotatory*; column 7, line 28, for the word "compound", first occurrence, read *composed*; and that the said Letters Patent should be read with these corrections therein that the same may conform to the record of the case in the Patent Office.

Signed and sealed this 27th day of April, A. D. 1948.

[SEAL]

THOMAS F. MURPHY,
*Assistant Commissioner of Patents.*